Nov. 23, 1937.　　　　　L. BELING　　　　　2,099,996
TEAPOT
Filed Nov. 3, 1936
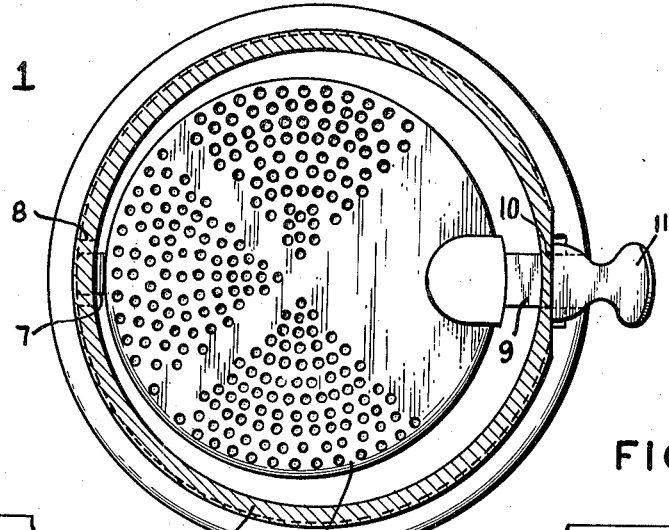
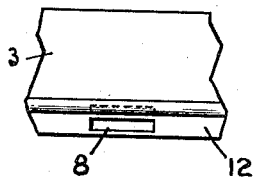
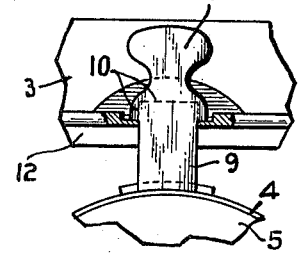
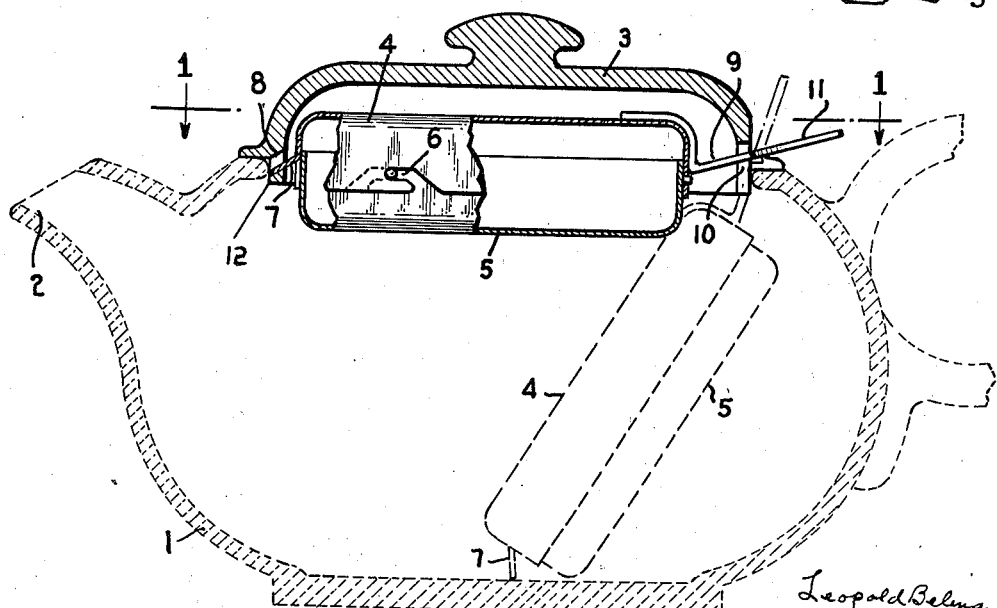
Leopold Beling,
Deceased, INVENTOR.
Christopher E. Beling
BY　　　　　　　　　　Executor
　　　　　　　　　　　　ATTORNEY.

Patented Nov. 23, 1937

2,099,996

UNITED STATES PATENT OFFICE 2,099,996

TEAPOT

Leopold Beling, deceased, late of Long Beach, N. Y., by Christopher C. Beling, executor, Newark, N. J.

Application November 3, 1936, Serial No. 108,941

1 Claim. (Cl. 53—3)

This invention relates to new and useful improvements in teapots, and more particularly to a detachable tea container which may be removably mounted in the cover of the teapot for immersion in and removal from the water in the pot.

In the drawing, Fig. 1 is a section along lines 1—1 of Fig. 4;

Figs. 2 and 3 are side elevations partly in section of details of the tea container; and Fig. 4 is a vertical cross-section of a teapot equipped with the improved tea container.

1 designates the conventional teapot having a pouring spout 2 and a concave cover 3. The tea is placed within a cartridge made, e. g., of perforated sheet aluminum, and consisting of a top 4 and a bottom 5 telescoping within one another and held together by means of a pin and bayonet slot connection 6. The shape and size of the cartridge is such that it partly fits within the cavity of the cover 3. To hold it within the cover a lip 7 projects from the top 4 of the cartridge and may be pushed within a slot 8 provided for that purpose in a flange 12 of the cover. A bar 9 is fastened to the top 4 of the cartridge at a point diametrically opposite to the lip 7 and projects through an aperture 10 in the cover, terminating on the outside of the cover in a handle 11.

By means of the handle 11 the cartridge 5, which has previously been filled with tea, can be placed in either one of the two positions indicated in Fig. 4; in the dotted position the tea is brewed, and in the position indicated in solid lines the cartridge is removed from contact with the water so as to stop the brewing operation.

The opening in the cover 3 is large enough for the handle 11 to pass through it when it is desired to remove the cartridge for cleaning and refilling. When tilting the cartridge from one position to another, the handle 11 cannot slip out because a shoulder formed between the handle 11 and lever 9 engages the flange of cover 3 at the cutout portion.

What is claimed is:

In combination, a teapot, a detachable concave cover for said teapot having an opening, a perforated cartridge for holding the tea and substantially conforming to the configuration of the cover, a flange depending from the cover within the teapot and having a perforation diametrically opposite said opening, a lip protruding from the cartridge and projecting through said perforation, and a handle fastened to the cartridge and projecting through the opening to the outside of the cover and by means of which the said lip may be moved in and out of said perforation and the cartridge submerged in the water in the teapot or removed from the water and held within the cavity of said cover.

CHRISTOPHER C. BELING,
Executor of the Last Will and Testament of Leopold Beling, Deceased.